(No Model.)

3 Sheets—Sheet 1.

A. H. LIGHTHALL.
GRAIN SEPARATOR.

No. 266,702.   Patented Oct. 31, 1882.

WITNESSES.
Wilmer Bradford
George Derby

INVENTOR—
Almerin H. Lighthall
By C. W. M. Smith
Attorney (No Model.) 3 Sheets—Sheet 2.
A. H. LIGHTHALL.
GRAIN SEPARATOR.

No. 266,702. Patented Oct. 31, 1882.

WITNESSES
Wilmer Bradford
George Derby

INVENTOR
Almirin H. Lighthall
By C. W. M. Smith
Attorney.

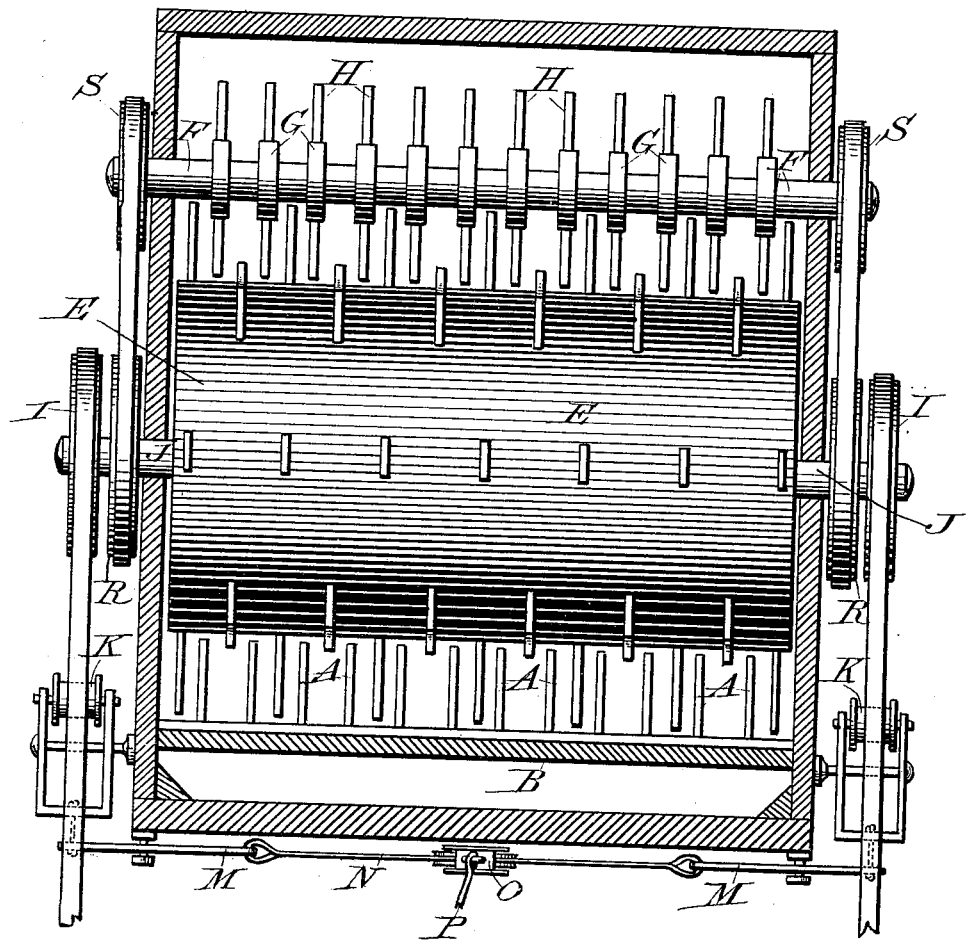

United States Patent Office.

ALMERIN H. LIGHTHALL, OF SAN FRANCISCO, CALIFORNIA, ASSIGNOR TO WILLIAM B. CARR, OF SAME PLACE.

GRAIN-SEPARATOR.

SPECIFICATION forming part of Letters Patent No. 266,702, dated October 31, 1882.

Application filed March 13, 1882. (No model.)

*To all whom it may concern:*

Be it known that I, ALMERIN H. LIGHTHALL, a citizen of the United States, and residing at San Francisco, in the county of San Francisco and State of California, have invented certain new and useful improvements in grain-separators and means for equalizing the tension of the belts driving the same, of which the following is a specification.

Figure 1:
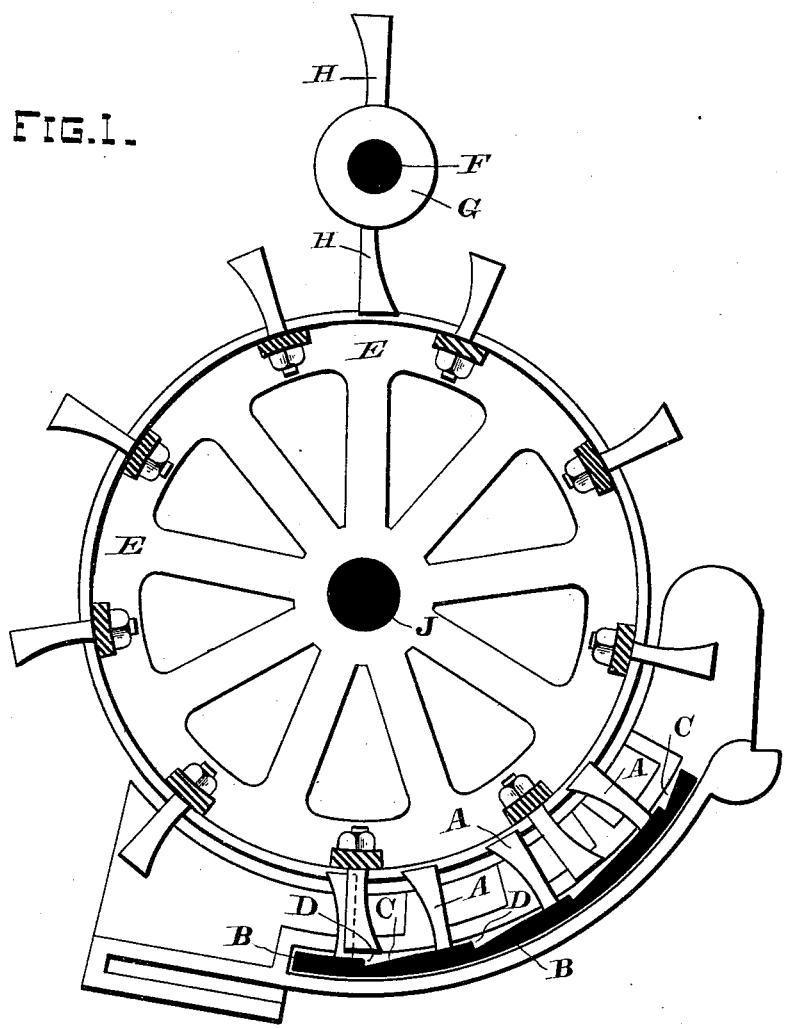
Figure 2:
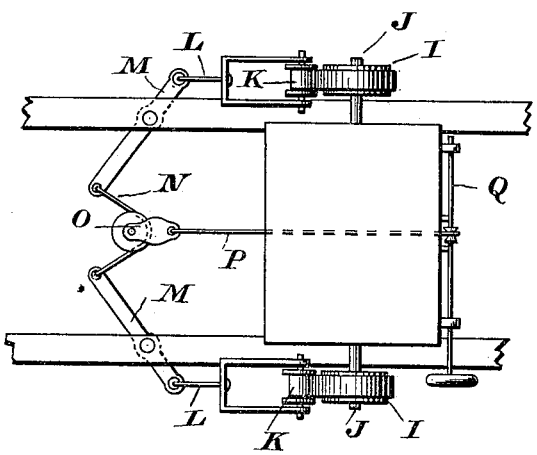

Figure 1 is a cross-sectional view through the cylinder of a grain-thrashing machine. Fig. 2 is a plan view of the same, showing the mechanism for equalizing the tension upon the driving-belts of the cylinder. Fig. 3 is a vertical section of a grain-thrasher lengthwise of the cylinder and showing the same in elevation.

The same letters of reference are used to nate the same or corresponding parts throughout the several figures.

Between the rows of teeth A A, upon the concave B, I form longitudinal serrations, riffles, or depressions C, made in the form shown in cross-section in Fig. 1. These serrations prevent any grain from sliding between the cylinder and concave, as when the heads or the kernels of grain strike the vertical side D of the depressions they are thrown backward and upward toward the cylinder. By this construction of the concave I am enabled to thoroughly thrash damp grain, which would be impossible to thrash in a machine provided with a smooth or plain concave.

Immediately over the cylinder E, and revolving in the same direction, I place the shaft F, upon which is keyed collars G, carrying cylinder-teeth H, which, when in operation, pass between the teeth of the cylinder and clear out from between said teeth all obstructions—such as weeds, sunflowers, and mustard—and thereby completely prevent the clogging of the cylinder and the wrapping or winding of any foreign substance around said cylinder, enabling the separator to perform a greater amount of work with a given power than has heretofore been possible.

In order that the cylinder may be driven in a uniform manner, I place band-wheels I I upon both ends of the shaft J, and, in order that the driving-belts may be pressed with equal force upon both band-wheels, I employ the device illustrated in Fig. 2, which consists of two ordinary friction-rollers, K K, applied to either belt, and connected by the rods L L to the lever-arms M M, which are pivoted to the under side of the machine, and their inner ends are connected by the slack cord N, which passes through a loose pulley-block, O, to which is connected the cord P, wound upon a reel-rod, Q, placed in suitable bearings upon the end of the separator-frame. By shortening up the cord P the inner ends of both lever-arms are drawn together and the pivoted belt-tighteners K K are pressed against the driving-belts with an equal amount of pressure. The shaft J is also provided with band-wheels R R, which are connected by suitable belting with similar wheels, S S, on the shaft F, thereby operating said shaft.

Having thus described my invention, what I claim, and desire to secure by Letters Patent, is—

1. In a grain-separator, the combination of the toothed cylinder E, shaft J, band-wheels R R, the shaft F, cylinder-teeth H, mounted thereon, band-wheels S S, and belting connecting said wheels with the wheels on the shaft J, substantially as shown and described.

2. In a grain-separator, cylinder-pulleys I I, mounted on both ends of its shaft, the pulleys K K, belted to pulleys I I, lever-rods L L, pivoted arms M M, slack cord N, pulley-block O, cord P, and reel-rod Q, substantially as and for the purpose described.

In testimony that I claim the foregoing I have hereunto set my hand and seal this 28th day of January, 1882.

ALMERIN H. LIGHTHALL. [L. S.]

Witnesses:
C. W. M. SMITH,
CHAS. E. KELLY.